(12) United States Patent
Okinaga et al.

(10) Patent No.: US 9,748,810 B2
(45) Date of Patent: Aug. 29, 2017

(54) MOTOR AND METHOD FOR MANUFACTURING STATOR THEREFOR

(71) Applicant: Panasonic Corporation, Osaka (JP)

(72) Inventors: Kinjirou Okinaga, Osaka (JP); Yasutake Seki, Osaka (JP); Tomomitsu Iida, Fukui (JP); Masato Yasuno, Fukui (JP); Masahito Hidaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 626 days.

(21) Appl. No.: 14/373,959

(22) PCT Filed: Jan. 17, 2013

(86) PCT No.: PCT/JP2013/000181
§ 371 (c)(1),
(2) Date: Jul. 23, 2014

(87) PCT Pub. No.: WO2013/136646
PCT Pub. Date: Sep. 19, 2013

(65) Prior Publication Data
US 2015/0035397 A1 Feb. 5, 2015

(30) Foreign Application Priority Data
Mar. 13, 2012 (JP) .................... 2012-055547

(51) Int. Cl.
*H02K 15/02* (2006.01)
*H02K 3/28* (2006.01)
(Continued)

(52) U.S. Cl.
CPC .............. *H02K 3/28* (2013.01); *H02K 1/148* (2013.01); *H02K 3/18* (2013.01); *H02K 3/345* (2013.01);
(Continued)

(58) Field of Classification Search
CPC ............. H02K 3/28; H02K 1/48; H02K 3/522
(Continued)

(56) References Cited

U.S. PATENT DOCUMENTS 4,350,914 A   9/1982   Searle
6,127,753 A   10/2000  Yamazaki et al.
(Continued)

FOREIGN PATENT DOCUMENTS

CN   1340237   3/2002
CN   1874114   12/2006
(Continued)

OTHER PUBLICATIONS

The Extended European Search Report dated Mar. 30, 2016 for the related European Patent Application No. 13761997.9.
(Continued)

*Primary Examiner* — Terrance Kenerly
(74) *Attorney, Agent, or Firm* — RatnerPrestia

(57) ABSTRACT

A stator core is formed by deforming a core assembly having core pieces coupled in a strip form into an annular shape, and by joining both ends of the core assembly together to make a core-fastening portion. Individual phase windings are routed from one end of the core assembly toward another end. Lead portion (43v) of phase winding (40v) and lead portion (43w) of phase winding (40w) make up respective wire terminals. Lead portion (43u) of another phase winding (40u) is extended through a plural number of the core pieces in a direction of the lead portions (43v and 43w), and a wire terminal of the extended lead portion (43u) and the wire terminals of the other lead portions (43v and 43w) are electrically connected to provide a neutral point of three-phase Y-connection circuit.

9 Claims, 9 Drawing Sheets

(51) Int. Cl.
*H02K 3/52* (2006.01)
*H02K 15/00* (2006.01)
*H02K 1/14* (2006.01)
*H02K 3/18* (2006.01)
*H02K 3/34* (2006.01)
*H02K 15/095* (2006.01)

(52) U.S. Cl.
CPC ......... *H02K 3/522* (2013.01); *H02K 15/0081* (2013.01); *H02K 15/022* (2013.01); *H02K 15/095* (2013.01); *H02K 2203/06* (2013.01); *Y10T 29/49009* (2015.01)

(58) Field of Classification Search
USPC .......................................................... 310/71
See application file for complete search history.

(56) References Cited

U.S. PATENT DOCUMENTS

| | | | |
|---|---|---|---|
| 2003/0011268 A1 | 1/2003 | Even et al. | |
| 2003/0117033 A1 | 6/2003 | Even et al. | |
| 2005/0242677 A1* | 11/2005 | Akutsu | H02K 3/28 310/179 |
| 2006/0279146 A1 | 12/2006 | Ishigami et al. | |
| 2007/0046132 A1 | 3/2007 | Yamamoto et al. | |
| 2007/0096587 A1* | 5/2007 | Ionel | H02K 1/148 310/216.009 |
| 2007/0279178 A1 | 12/2007 | Zimmer et al. | |
| 2009/0309452 A1 | 12/2009 | Tao et al. | |
| 2011/0020154 A1 | 1/2011 | Matsuda et al. | |

FOREIGN PATENT DOCUMENTS

| | | |
|---|---|---|
| EP | 0833427 | 4/1998 |
| EP | 1143596 | 10/2001 |
| EP | 1780869 | 5/2007 |
| JP | 09-037494 A | 2/1997 |
| JP | 10271718 | 10/1998 |
| JP | 2000-232745 A | 8/2000 |
| JP | 2001-516785 A | 6/2004 |
| JP | 2004-516784 A | 6/2004 |
| JP | 2005318733 | 11/2005 |
| JP | 2009-303420 A | 12/2009 |
| JP | 2010-172195 A | 8/2010 |
| JP | 2011-035947 A | 2/2011 |
| MY | 128073 | 1/2007 |
| WO | WO 00/48292 A1 | 8/2000 |
| WO | WO 02/50976 A2 | 6/2002 |
| WO | WO 02/50977 A2 | 6/2002 |

OTHER PUBLICATIONS

English Translation of Chinese Search Report dated Mar. 15, 2016 for the related Chinese Patent Application No. 201380013953.5.
International Search Report for Application No. PCT/JP2013/000181, dated Apr. 13, 2013.

* cited by examiner

MOTOR AND METHOD FOR MANUFACTURING STATOR THEREFOR

TECHNICAL FIELD

The present invention relates to a structure of a stator of a motor that is driven by a three-phase alternating-current power supply, and a method for manufacturing the stator.

BACKGROUND ART

Numerous techniques have hitherto been proposed in which methods of winding coil wires as well as structures of windings wound on stator cores, in order to improve efficiency of winding work and space factors of the windings inside slots of motor stators of such a type that is driven by a three-phase power supply (refer to Patent Literature 1, for example).

Patent Literature 1 provides an improvement of a connecting structure of neutral wires to form a neutral point of the three-phase Y-connection, and simplifies the connection of windings in a stator. That is, in the stator having a plurality of magnetic polar teeth along the circumferential direction, neutral wires of coils of any two phases among the three phases are connected individually to a neutral wire of the other phase coil at their respective positions. This helps form a neutral point by connecting a reduced number of the neutral wires, and simplifies the wire connections.

According to the technique disclosed in Patent Literature 1, however, the winding and wiring process, including the above-described step of connecting the neutral wires needs to be carried out on a stator core having magnetic polar teeth disposed in an annular shape. In other words, it requires a task of complicated wiring work in the wiring step of the windings of the stator assembly in order to complete the winding and wiring process of the annularly-shaped stator core, and it hence gives rise to a problem of not being able to achieve a sufficient degree of simplification in the winding and wiring process including the process of connecting the neutral wires.

CITATION LIST

Patent Literature

PTL 1: Unexamined Japanese Patent Publication No. 2000-232745

SUMMARY OF THE INVENTION

A motor of the present invention comprises a rotor having a plurality of magnetic poles around a rotary shaft, and a stator having windings wound on a stator core formed by coupling twelve core pieces, each including a tooth, and the motor is driven by a three-phase alternating-current (ac) power supply. The stator core of this motor is formed by deforming a core assembly having the core pieces coupled in a strip form into an annular shape, and by joining both ends of the core assembly together to make a core-fastening portion. The windings include a first phase winding, a second phase winding and a third phase winding corresponding to their respective phases. Each of these phase windings includes a winding portion wound around designated core pieces to form a plurality of coils, and lead portions led out from the winding portion, and that these phase windings are routed around from one end of the core assembly to the other end. Then the lead portions of the first phase winding and the second phase winding are formed into wire terminals, the lead portion of the third phase winding is extended through a plural number of the core pieces in a direction of the other two lead portions, and a wire terminal formed of the extended lead portion and the wire terminals of the other two lead portions are electrically connected to provide a neutral point of the three-phase Y-connection circuit.

A method for manufacturing a stator of the present invention is a manufacturing method of the stator in the motor of this invention, which comprises a step of forming a core assembly by stacking a plurality of core sheet materials into layers, a step of forming a winding assembly by winding windings on individual core pieces of the core assembly according to a winding pattern, a step of extending a lead portion of a third phase winding through a plural number of the core pieces in a direction of other two lead portions and electrically connecting a wire terminal of the extended lead portion and wire terminals of the other two lead portions, and a step of deforming the winding assembly into an annular shape and joining together both ends of the winding assembly.

According to the above structure, it becomes possible to carry out the process of forming windings on the core assembly having the core pieces aligned in a strip form, as well as the work of wiring the windings to provide the neutral point only at one side of the core assembly, or the one end to which the phase winding is routed from the other end. In an embodiment of this invention, it is therefore not necessary to do such a complicated work as forming windings on an annularly shaped stator core, thereby helping to carry out the winding and wiring processes easily.

As described, the present invention can provide the motor having a structure capable of simplifying the winding and wiring processes, and the method for manufacturing the stator of the motor since it can facilitate the process of forming the windings on the core assembly as well as the work of wiring the windings to form the neutral point only at one end of the core assembly.

DESCRIPTION OF EMBODIMENT

Description is provided hereinafter of a motor and a method for manufacturing a stator of the motor according to an exemplary embodiment of the present invention with reference to the accompanying drawings.

EXEMPLARY EMBODIMENT

Figure 1:
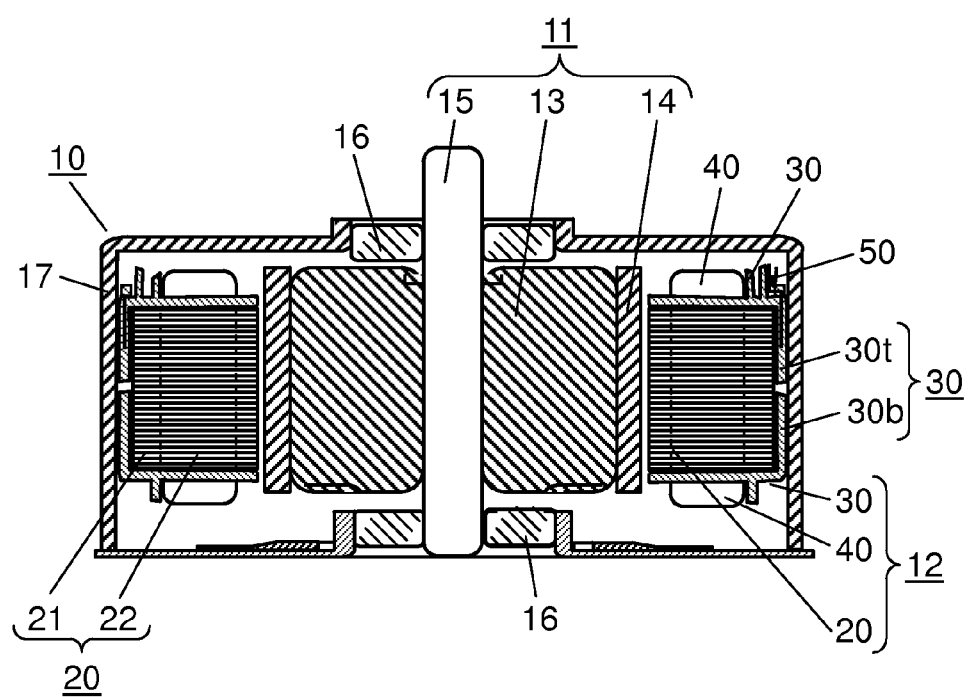
FIG. 1 is a sectional view of a motor according to one exemplary embodiment of the present invention.
Figure 2:
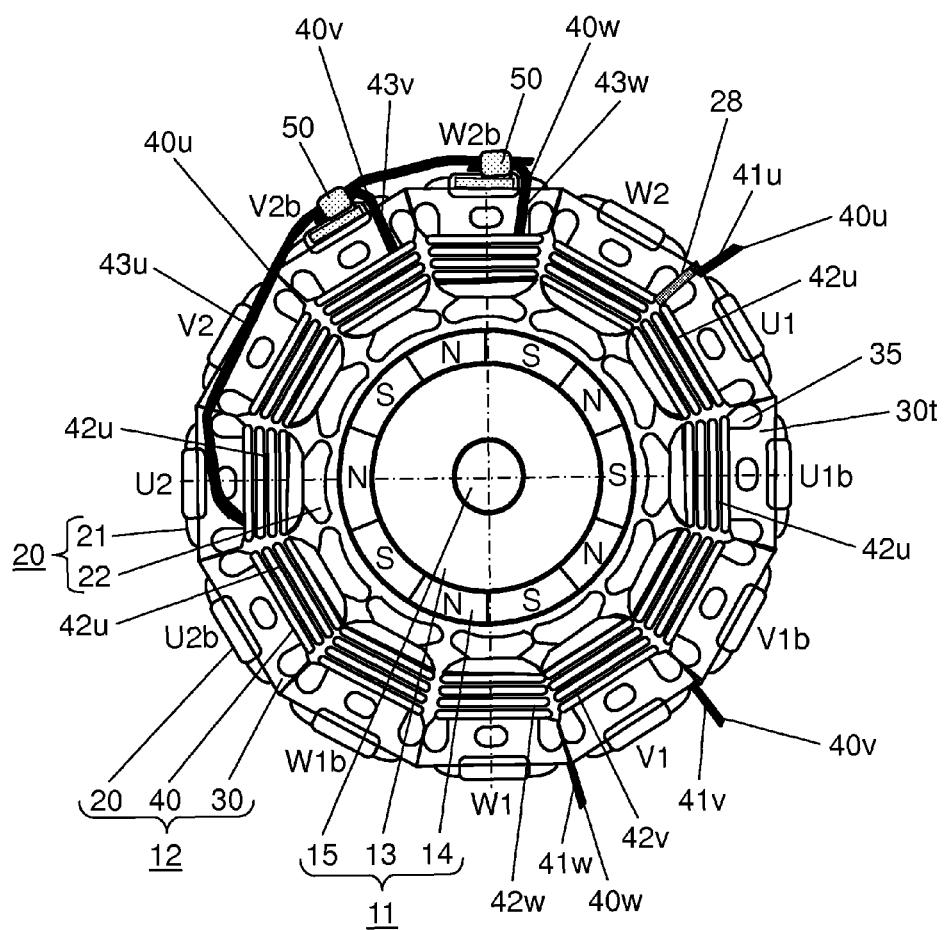
FIG. 2 is a top view that illustrates a main portion of the motor.

FIG. 1 is a sectional view of motor 10, and FIG. 2 is a top view of motor 10 showing a main portion thereof, according to one exemplary embodiment of the present invention. In this exemplary embodiment, description is provided of an example of inner-rotor brushless motor having a rotor disposed to an inner side of a stator. This brushless motor is electrically driven by a three-phase alternating current (ac) power supply having U phase, V phase and W phase that are different in phase angle of 120 degrees from one another. In addition, windings of the individual phases of this brushless motor are formed into a Y-connection in which end terminals of these windings are electrically connected as a neutral point to make three-phase driving.

Motor 10 of this exemplary embodiment comprises rotor 11 and stator 12, as shown in FIG. 1 and FIG. 2.

Rotor 11 has magnets 14 retained along an outer periphery of cylindrical rotor yoke 13 to form magnetic poles, and rotates around rotary shaft 15.

Rotary shaft 15 penetrates through rotor yoke 13, and holds rotor yoke 13 in a central portion of rotary shaft 15. Moreover, magnets 14 made of permanent magnets are fixed integrally into an annular shape on the outer periphery of rotor yoke 13. Rotor 11 shown in this embodiment is an example, in which five pairs of magnets 14, each consisting of an S-pole and an N-pole are retained so that rotor 11 is magnetized with ten poles in a circumferential direction as shown in FIG. 2. Rotary shaft 15 extending in an axial direction from the rotor yoke 13 penetrates through each of bearings 16 so that rotor 11 is rotatably supported by bearings 16.

Stator 12 has windings 40 wound on stator core 20 with insulator 30 interposed therebetween. Stator core 20 comprises yoke 21 of an annular shape, and a plurality of teeth 22 that protrude inward from yoke 21. Individual teeth 22 are disposed at regular intervals along the circumferential direction in a manner to confront rotor 11, and each of teeth 22 is provided with winding 40 wound around it to correspond with each of the phases. There are twelve pieces of such teeth 22 provided in this embodiment. In other words, stator 12 has a structure comprising twelve pieces of circularly combined coils, in which each coil is formed of winding 40 wound on a core piece having tooth 22 and a yoke piece that forms a part of yoke 21, of which details will be describes in a later section. Stator core 20 is constructed of a plurality of magnetic steel sheets stacked into layers in an axial direction. In addition, stator core 20 is formed into an annular structure by deforming a core assembly having the core pieces coupled in a linearly strip form into an annular shape in the circumferential direction, and by joining core-fastening portion 28 by welding or the like method.

As described, motor 10 includes rotor 11 disposed to an inner side of stator 12 such that individual teeth 22 of stator core 20 and magnets 14 of rotor 11 confront with a gap between them. Motor 10 is then constructed by disposing rotor 11 and stator 12 of such structures inside casing 17, as shown in FIG. 1. One end of rotary shaft 15 protrudes from casing 17 to serve as an output shaft to rotatory drive a load.

In this embodiment, insulator 30 is made up of two different elements that are insulator 30t attached to an output-shaft side face and insulator 30b attached to an anti-output-shaft side face of stator core 20, as will be describes in details in a later section. The drawing in FIG. 2 shows the one side where insulator 30t is attached. There are two terminal pins 50 attached to insulator 30t.

Motor 10 is driven when windings 40 are energized by a three-phase ac power supply having U phase, V phase and W phase that are different in phase angle of 120 degrees from one another, as described above. In order to drive in three phase, windings 40 comprise three phase windings corresponding to respective phases that are phase winding 40u for ac current of the U phase to flow, phase winding 40v for ac current of the V phase to flow, and phase winding 40w for ac current of the W phase to flow, as shown in FIG. 2. Each of the phase windings includes winding portions wound around a designated number of teeth 22 to form coils, and lead portions led out from the winding portions. In an instance of phase winding 40u in FIG. 2, a structure of phase winding 40u includes lead portion 41u of a winding-start end, four winding portions 42u wound around four designated teeth 22, and lead portion 43u of a winding-finish end of phase winding 40u lead out from the last-wound one of winding portions 42u.

Similarly, phase winding 40v includes lead portion 41v of a winding-start end, four winding portions 42v wound around teeth 22, and lead portion 43v lead out from the last-wound one of winding portions 42v. Phase winding 40w includes lead portion 41w of a winding-start end, four winding portions 42w wound around teeth 22, and lead portion 43w lead out from the last-wound one of winding portions 42w. In FIG. 2, crossover wires connecting between the winding portions are not shown to avoid complexity. Insulator 30t is provided with protrusion 35 used for hitching the crossover wires.

In the individual phase windings, lead portions 41u, 41v and 41w of the winding-start ends are connected to their respective input terminals (not shown in the figure) through which the ac power of U phase, V phase and W phase is applied.

In addition, the lead portions at the winding-finish ends of the individual phase windings are electrically connected together to form a neutral point of the Y-connection circuit according to this embodiment. That is, lead portion 43v of phase winding 40v designated as a first phase winding for the V phase, and lead portion 43w of phase winding 40w designated as a second phase winding for the W phase are routed out as wire terminals that are near the ends of the winding phases, as shown in FIG. 2. On the other hand, lead portion 43u of phase winding 40u designated as a third phase winding for the U phase is routed to extend longer than any of lead portions 43v and 43w. Lead portion 43u is thus extended through a plural number of the core pieces toward the other two lead portions, that is, in a direction of lead portions 43v and 43w. The wire terminal of the extended lead portion 43u is then connected with lead portions 43v and 43w by using terminal pins 50. By virtue of the above structure, this exemplary embodiment achieves simplification of connection of the neutral wires to make the neutral point of the Y-connection circuit.

When individual phase windings 40u, 40v and 40w in motor 10 of the above structure are energized with an ac power supply having U phase, V phase and W phase, magnetic attractive forces and repulsive forces occur between individual teeth 22 of stator 12 and magnets 14 of rotor 11, and they cause rotor 11 to rotate around rotary shaft 15.

Next, description is provided in detail of a wiring structure of windings 40 wound in stator 12.

Figure 3:
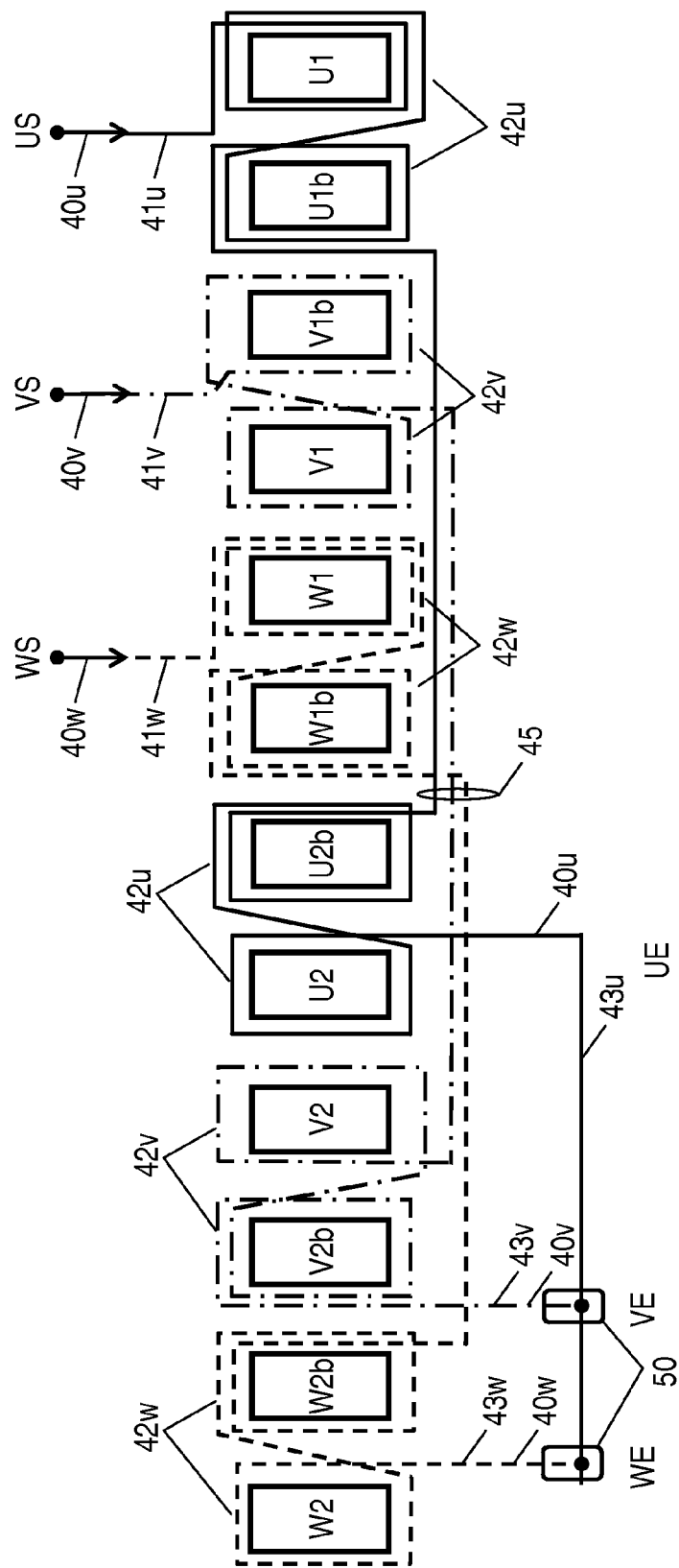
FIG. 3 is a development view of windings of the motor.

FIG. 3 is a development view of windings of motor 10 according to this exemplary embodiment of the invention. In FIG. 3, the wiring of windings 40 shown in FIG. 2 is developed to make the wiring of the windings of stator 12 more comprehensible. Referring to FIG. 3, details of stator 12 is described below with a particular emphasis on wiring processes of the individual phase windings.

First of all, stator 12 has a structure provided with twelve teeth 22, and is driven by a three-phase power. For this purpose, four teeth 22, or four coils are assigned to each of the phases. In this embodiment, four each of the coils are assigned in the following manner. The first to note is that a pair of adjoining two of the coils is assigned to be one coil pair, and coil pairs are arranged in order of U phase, V phase and W phase in the circumferential direction. In each of the coil pairs, windings 40 are wound in opposite directions from each other. That is, the mutually adjoining coils of the same phase have their windings 40 wound in the directions opposite to each other. In addition, the mutually adjoining coils of different phases have their winding 40 wound in the same direction with each other.

To be specific, coils U1 and U1b are assigned first as to be one coil pair, as shown in FIG. 3. Such coil pairs are arranged in order of U phase (U1 and U1b), V phase (V1b and V1), W phase (W1 and W1b), U phase (U2b and U2), V phase (V2 and V2b), and W phase 2b and W2). Then, phase winding 40u from winding-start end US to winding-finish end UE, phase winding 40v from winding-start end VS to winding-finish end VE, and phase winding 40w from winding-start end WS to winding-finish end WE are disposed in a manner as described next.

For the U phase, phase winding 40u is wound clockwise around the first one of teeth 22 from lead portion 41u of the winding-start end to form coil U1, as shown in FIG. 3. Phase winding 40u is then wound counterclockwise around another tooth 22 next to coil U1 to form coil U1b. Phase winding 40u is passed on to the next coil pair of the U phase by skipping the next four coils through crossover wire 45, to form counterclockwise coil U2b and clockwise coil U2. Finally, phase winding 40u is led out between coils U2b and U2 to make it as lead portion 43u of the winding-finish end.

Similarly, phase winding 40v starts at lead portion 41v of the winding-start end, forms a coil pair of counterclockwise coil V1b and clockwise coil V1, and another coil pair of clockwise coil V2 and counterclockwise coil V2b according to a winding pattern shown in the development view of FIG. 3. Phase winding 40v is then led out from coil V2b at an opposite side of coil V2, and the led-out portion is made to be lead portion 43v of the winding-finish end. Likewise, phase winding 40w starts at lead portion 41w of the winding-start end, forms a coil pair of clockwise coil W1 and counterclockwise coil W1b, and another coil pair of counterclockwise coil B2b and clockwise coil W2. Phase winding 40w is then led out between coils W2b and W2 to make it as lead portion 43w of the winding-finish end.

After completion of the winding processes, the led-out lead portions 43u, 43v and 43w are cut to their appropriate lengths. The led-out lead portion 43u is then connected to lead portion 43v with terminal pin 50, and also to lead portion 43w with another terminal pin 50, as mentioned above.

A series coil comprising four serially connected coils is formed for each of the phases, as a result of the above wiring processes of windings 40. One ends of three series coils are then connected together with terminal pins 50 to form the neutral point of the Y-connection. By virtue of the above wiring, in particular, it becomes unnecessary to carry out complicated work of forming the windings, since the individual phase windings can be wound around bare stator core 20 from one end to the other end in one direction. It also becomes easier to make connection of the neutral wires since the neutral point is formed at the end where the windings are wound into one direction. In addition, as shown in FIG. 3, routing of crossover wires 45 and connection of the neutral wires can be made only on one side of the coils (i.e., the lower side of coils U1 and the others in FIG. 3), according to this embodiment. In other words, the routing of crossover wires 45 and connection of the neutral wires can be completed only on one face side of stator core 20, which can ease the complicated wiring of the coil windings, and achieve an improvement in the working efficiency. In this embodiment, the work of routing such wires as crossover wires 45 can be made only on one side next to insulators 30t by using protrusions 35, to be more specific.

Figure 4:
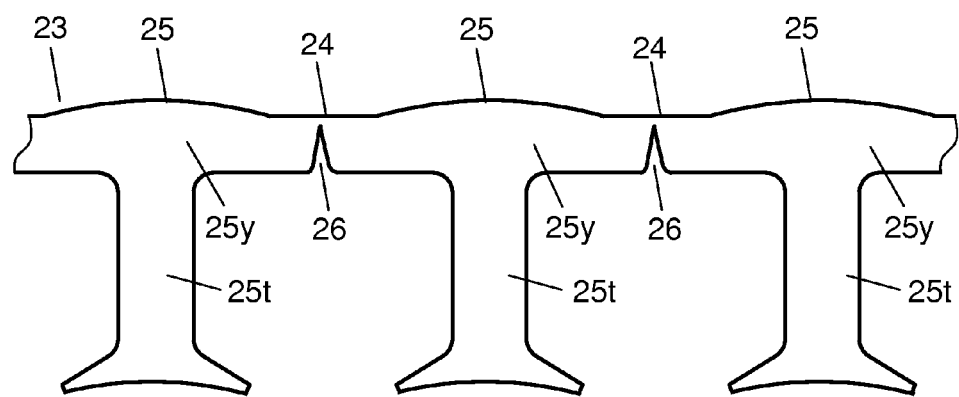
FIG. 4 is a plan view of a core assembly of the motor.

Description is provided next about a detailed structure of stator 12. FIG. 4 is a plan view of core assembly 23, which serves a basis to form stator core 20 of motor 10 according to this exemplary embodiment of the invention. Core assembly 23 comprises a plurality of core pieces 25 coupled via connecting portions 24, as shown in FIG. 4. Core assembly 23 is formed by stacking a plurality of core sheet materials that are produced by stamping out magnetic steel sheet of a strip form into pieces of a predetermined shape shown in FIG. 4. In this embodiment, twelve pieces of such core piece 25 are coupled in series, and each of core pieces 25 is configured of tooth portion 25t to form tooth 22, and yoke portion 25y to form a part of yoke 21. There is V-shaped notch 26 formed in each area of connecting portions 24. Stator core 20 of an annular shape is formed by plastically deforming connecting portions 24 of such core assembly 23. According to this embodiment, stator 12 is formed by deforming core assembly 23 into the annular shape after coil windings 40 are wound on it, rather than winding coil windings 40 after completing stator core 20 by deforming core assembly 23 into the annular shape.

Figure 5:
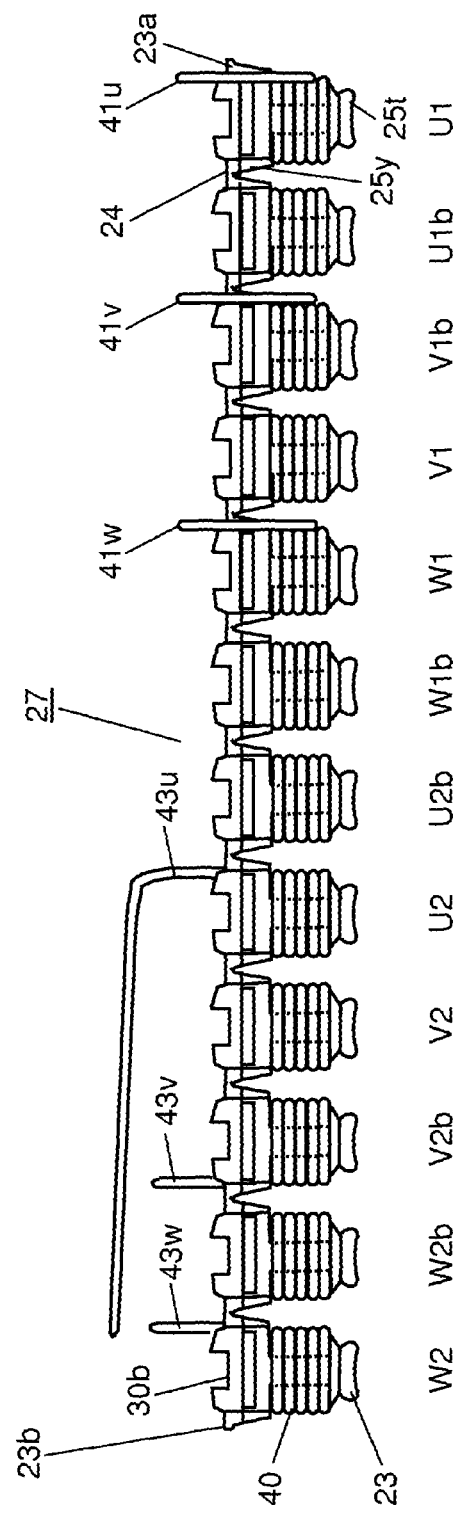
FIG. 5 is a schematic drawing of a winding assembly of the motor.

FIG. 5 is a schematic drawing of winding assembly 27 formed of windings 40 wound on core assembly 23 according to this exemplary embodiment of the invention. The drawing in FIG. 5 shows one side where insulator 30b is attached. Winding assembly 27 is constructed in the following manner. That is, for each of core pieces 25 of core assembly 23 shown in FIG. 4, insulator 30t is attached to one side and insulator 30b is attached to the other side. The individual phase windings are then wound around their respective tooth portions 25t with insulators 30 (i.e., 30t and 30b) placed between them, starting from one end of core assembly 23 toward the other end according to the winding pattern shown in FIG. 3. Thus completed by the above processes is winding assembly 27 in which the coils having windings 40 wound on core pieces 25 are aligned linearly.

Description is provided next in detail of processes to form the neutral point by using terminal pins 50.

Figure 6:
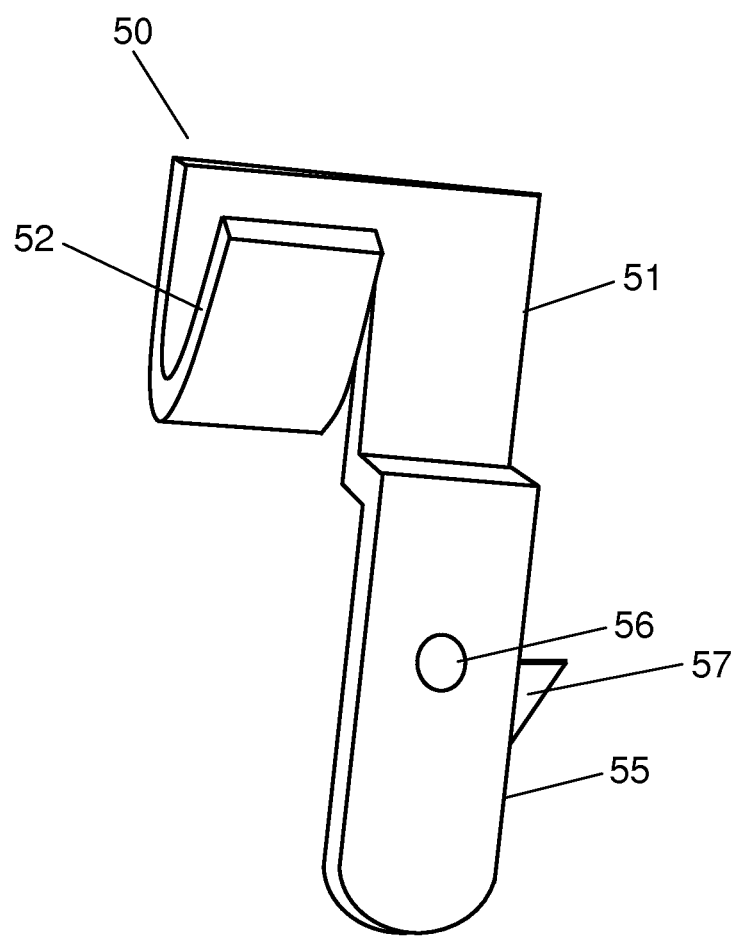
FIG. 6 is a perspective view of a terminal pin of the motor.

FIG. 6 is a perspective view of terminal pin 50 attached to stator 12 of motor 10 according to this exemplary embodiment of the invention.

In this embodiment, lead portions 43u, 43v and 43w of windings 40 are electrically connected to one another by using terminal pins 50 to form the neutral point, as mentioned above. Terminal pins 50 are made of a metallic material for the purpose of making the process of wiring the lead portions of windings 40, and tin-plated copper is used in this embodiment. As shown in FIG. 6, a typical structure of terminal pin 50 includes inserting portion 55 with which terminal pin 50 is inserted into insulator 30t, and wire-engaging portion 51 that protrudes on insulator 30t and is used for engaging the lead portion. Inserting portion 55 is additionally provided with hook-shaped key 57 for preventing terminal pin 50 from slipping out of insulator 30t, and protrusion 56 for preventing play and looseness. Furthermore, wire-engaging portion 51 includes wire clamper 52 having a U-shaped hook for connecting lead portion 43u to lead portion 43v or lead portion 43u to lead portion 43w.

Figure 7:
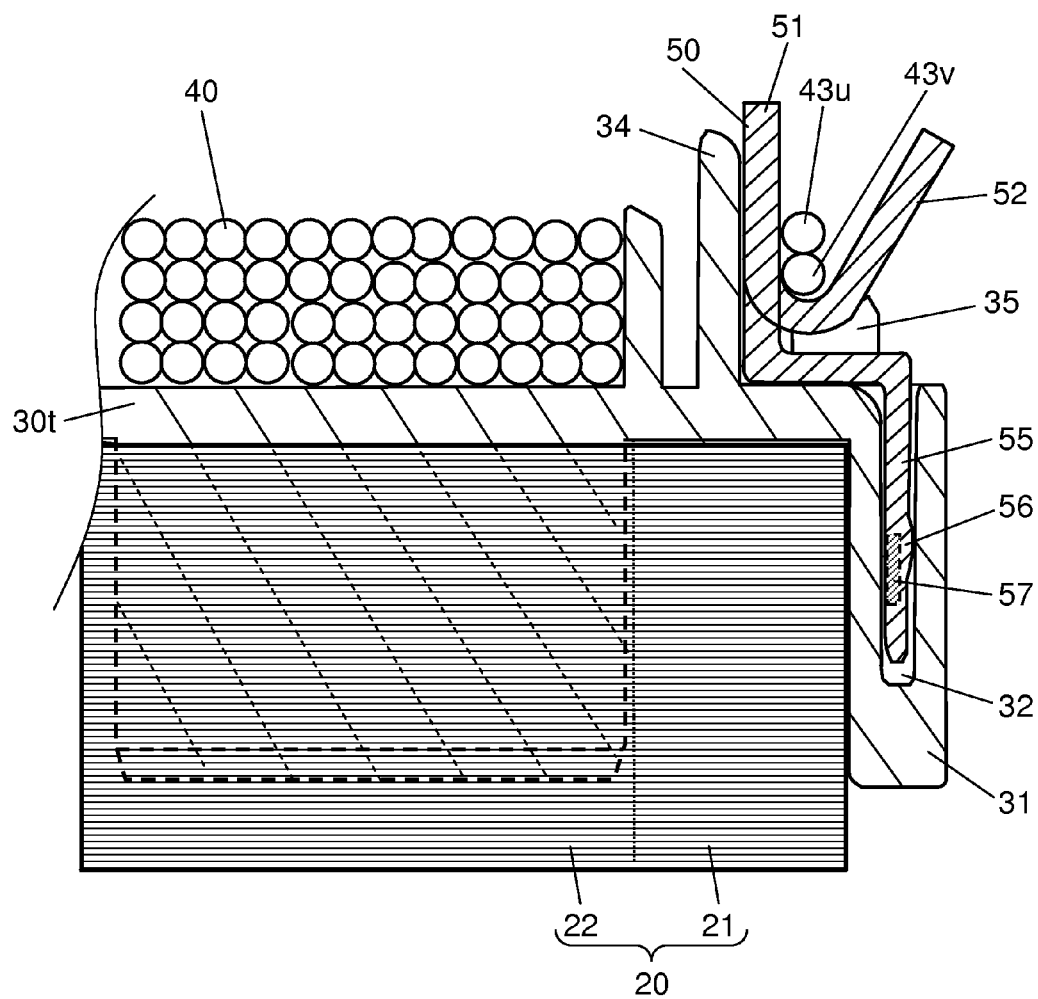
FIG. 7 is a sectional view showing a configuration wherein the terminal pin is inserted in an insulator of the motor.

FIG. 7 is a sectional view showing a configuration wherein terminal pin 50 is inserted in insulator 30t of motor 10 according to this exemplary embodiment of the invention. In this embodiment, insulator 30t of a shape such as this is disposed on a face of core piece 25 at the output shaft side.

Insulator 30t is provided with insertion hole 32 as a pin retainer wherein terminal pin 50 is inserted and retained, in outer edge portion 31 that covers a peripheral face of yoke 21, as shown in FIG. 7. Insertion hole 32 has a bump for catching key 57 so that terminal pin 50 is not easily pulled out once key 57 is inserted in insertion hole 32. In addition, insertion hole 32 has a width so designed that protrusion 56 of terminal pin 50 presses against an inner wall of insertion hole 32, thereby preventing play of terminal pin 50. By virtue of the above structure, terminal pin 50 can be fixed easily with an adequate strength to stator 12. Furthermore, insulator 30t has wall 34 formed at one side facing an inner periphery of terminal pin 50 such that wall 34 comes to surface contact with wire-engaging portion 51 of terminal pin 50. This wall 34 increases a fixing strength of terminal pin 50, and prevents terminal pin 50 form coming into contact with any of windings 40.

Figure 8:
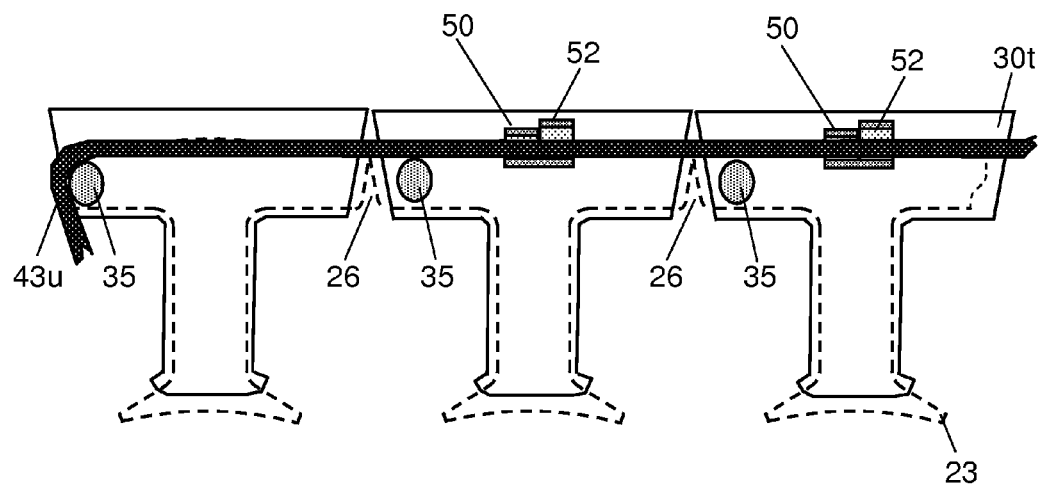
FIG. 8 is a top view showing the structure wherein the terminal pin is inserted in the insulator of the motor.

FIG. 8 is a top view showing the structure wherein terminal pins 50 are inserted in insulator 30t.

In this embodiment, terminal pins 50 are disposed in positions outside of protrusion 35 in an elongating direction of tooth portion 25t as shown in FIG. 8. Since terminal pins 50 are disposed in such positions, lead portion 43u can be disposed easily into U-shaped wire clampers 52 of terminal pins 50 only by routing lead portion 43u straight in a direction of serially coupled core pieces 25, as shown in FIG. 8.

In addition, this embodiment is so configured that crossover wire 45 and lead portion 43u are routed along a path adjacent to tip ends of V-shaped notches 26 of core assembly 23. FIG. 8 shows a relationship in the position of lead portion 43u with respect to notches 26, as one example. Since crossover wire 45 routed in this manner along such a position on core assembly 23 can avoid crossover wire 45 from being subjected to a tension or becoming slack in opposite cases, thereby enabling to form annular shaped stator 12 consistently.

Terminal pin 50 of such a configuration is inserted in each of insertion holes 32 of insulators 30t adjacent to lead portions 43u and 43w in winding assembly 27 having a series of the coils aligned linearly, as shown in FIG. 5. The wire terminal of lead portion 43v is then hooked to wire clamper 52 of one of terminal pins 50 inserted in insulator 30t, and the wire terminal of lead portion 43u is also hooked to the same wire clamper 52 as shown in FIG. 7. After that, lead portions 43u and 43v are connected by deforming the U-shaped portion of wire clamper 52 closed. Lead portions 43u and 43w are also connected in the like manner by using another terminal pin 50. Wire clampers 52 that hold these lead portions are additionally soldered to complete electrical connections of lead portions 43u, 43v and 43w.

A winding assembly unit, or completed winding assembly 27 can thus be made as a result of the above processes of connections between the individual lead portions and terminal pins 50 on winding assembly 27.

According to this embodiment, it is possible to carry out the processes of forming the above-mentioned neutral point only at one side of winding assembly 27 under the condition that winding assembly 27 has the coils kept aligned linearly. It is therefore not necessary in this embodiment to do such complicated work of forming and wiring the windings on the annularly shaped stator core, and it can hence simplify the winding and wiring processes.

Stator 12 of the annular shape in this embodiment is constructed by plastically deforming the completed winding assembly unit provided with the neutral point formed with the terminal pins 50 into the annular shape, and joining the both ends 23a and 23b defined as core-fastening portion 28.

Additionally, insulator 30t is provided with protrusion 35 for hitching the winding wire to help route crossover wire 45 easily.

As described above, stator core 20 of this exemplary embodiment is formed by deforming core assembly 23 having core pieces 25 coupled in a strip form into the annular shape, and by joining both the ends of core assembly 23 together to make core-fastening portion 28. Moreover, windings 40 comprise phase windings 40u, 40v and 40w corresponding to respective phases. Each of phase windings 40u, 40v and 40w includes winding portions wound on a designated number of core pieces 25 to form a plurality of coils, and lead portions that are led out from the winding portions, and that they are wound around from one end of core assembly 23 toward the other end. Then, lead portion 43v of phase winding 40v and lead portion 43w of phase winding 40w are formed into wire terminals, lead portion 43u of phase winding 40u is extended through the plurality of core pieces 25 in the direction of lead portions 43v and 43w, and the extended wire terminal and the other wire terminals of lead portions 43v and 43w are electrically connected to provide the neutral point of the three-phase Y-connection circuit. According to this embodiment, stator 12 is constructed by carrying out the process of connecting the neutral wires first in a mid-stage of winding assembly 27 having the coils aligned linearly to complete winding assembly 27, which is then deformed into the annular shape, as discussed above, and this can therefore help ease the processes of winging and wiring, and improve the reliability of stator 12.

Next, description is provided in detail of a method for manufacturing stator 12 according to this exemplary embodiment of the invention.

Figure 9:
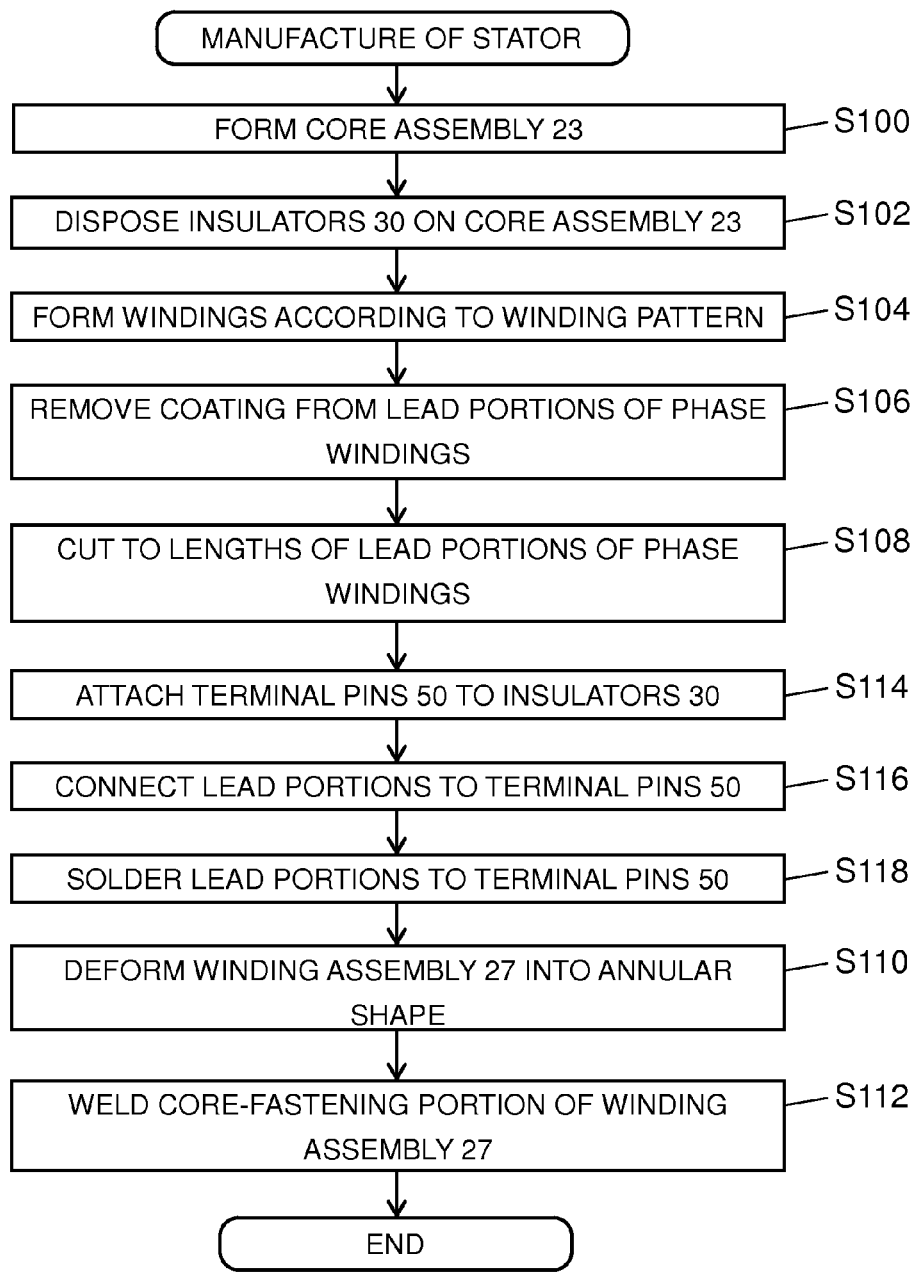
FIG. 9 is a flow chart representing individual steps in a method for manufacturing a stator according to one exemplary embodiment of the present invention.

FIG. 9 is a flow chart representing individual steps in the method for manufacturing stator 12 in this embodiment of the invention. The description of the method for manufacturing stator 12 in this embodiment will be given hereinafter by following the flow chart of FIG. 9.

At the beginning of manufacturing stator 12, core assembly 23 is formed as a basic component of stator 12 (step S100). In other words, a strip form of magnetic steel sheet is die-stamped first into pieces of a predetermined shape shown in FIG. 4 to form core sheet materials, as described previously. A plural number of the core sheet materials are stacked into layers to form core assembly 23 shown in FIG. 4.

Next, insulators 30 are attached to the individual core pieces 25 of core assembly 23 (step S102). More specifically, insulator 30t is attached to one side, and insulator 30b is attached to the other side of each of core pieces 25 of core assembly 23.

Next, while insulators 30 are placed on tooth portions 25t of the individual core pieces 25, windings 40 are wound around tooth portions 25t individually, starting from one end toward the other end of core assembly 23 to form the individual phase windings according to the winding pattern shown in FIG. 3 (step S104). Upon completion of the winding step, insulating coating is removed from predetermined parts of the lead portions of phase windings 40u, 40v and 40w by a mechanical process, solder-dipping process, or the like (step S106). The lead portions are then cut to predetermined lengths (step S108). The above steps complete winding assembly 27 shown in FIG. 5, in which the coils having windings 40 wound on core pieces 25 are aligned linearly.

In the next step, one each of terminal pins 50 is attached to predetermined two pieces of insulators 30t (step S114). To be specific, inserting portion 55 of each of terminal pins 50 is inserted in insertion hole 32 of insulator 30t adjacent to lead portion 43v of phase winding 40v, and in another insertion hole 32 of insulator 30t adjacent to lead portion 43w of phase winding 40w.

Next, lead portions 43u, 43v and 43w are connected to predetermined terminal pins 50 (step S116). To be specific, the wire terminal of lead portion 43v is hooked to wire clamper 52 of one of terminal pins 50, and the wire terminal of lead portion 43w is hooked to wire clamper 52 of the other terminal pin 50. Lead portion 43u is then hooked to wire dampers 52 of both of terminal pins 50, and the U-shaped portions of these wire clampers 52 are deformed to close them. After that, wire clampers 52 of terminal pins 50 are soldered with the lead portions held in them (step S118). The above steps connect lead portions 43u, 43v and 43w electrically, form the neutral point, and hence complete the winding assembly unit.

Next, the completed winding assembly unit is plastically deformed into an annular shape by using thin connecting portions 24 of winding assembly 27 (step S110). Subsequently, both ends 23a and 23b of the winding assembly unit are joined by such means as welding and fusing (i.e., resistance welding) to form core-fastening portion 28 (step S112). Stator 12 of the annular structure is thus formed.

In this embodiment, stator 12 is formed by following the steps as illustrated above. According to this embodiment, winding assembly 27 is completed in the steps S114 to S118 by making the process of connecting the neutral wires, particularly in the mid-stage of winding assembly 27 in which the coils are aligned linearly. Following the above, the completed winding assembly 27 is deformed into the annular shape in the steps S110 to S112 to form stator 12. It is therefore unnecessary to do such complicated work as the wiring process on the annularly shaped stator core, and it can hence facilitate the winding and wiring processes easily, and improve the reliability of stator 12.

INDUSTRIAL APPLICABILITY

Since the motor and the method for manufacturing the stator of the motor according to the exemplary embodiment of this invention can simplify the winding process and improve their reliability, they are applicable to electric apparatuses equipped with motors such as home appliances and electrical equipment.

REFERENCE MARKS IN THE DRAWINGS 10 motor
11 rotor
12 stator
13 rotor yoke
14 magnet
15 rotary shaft
16 bearing
17 casing
20 stator core
21 yoke
22 tooth
23 core assembly
23a, 23b end
24 connecting portion
25 core piece
25t tooth portion
25y yoke portion
26 notch
27 winding assembly
28 core-fastening portion
30, 30b, 30t insulator
31 outer edge portion
32 insertion hole
34 wall
35 protrusion
40 winding
40u, 40v, 40w phase winding
41u, 41v, 41w, 43u, 43v, 43w lead portion
42u, 42v, 42w winding portion
45 crossover wire
50 terminal pin
51 wire-engaging portion
52 wire damper
55 inserting portion
56 protrusion
57 hook-shaped key

The invention claimed is:

1. A motor comprising a rotor having a plurality of magnetic poles around a rotary shaft, and a stator having a winding wound on a stator core formed of serially coupled twelve core pieces, each of which includes a tooth, the motor for being driven by a three-phase alternating-current power supply,
wherein:
the stator core is formed by deforming a core assembly having the core pieces coupled in a strip form into an annular shape, and by joining both ends of the core assembly together to make a core-fastening portion;
the winding comprises a first phase winding, a second phase winding and a third phase winding corresponding to respective phases;
each of the phase windings includes a winding portion wound on a designated number of the core pieces to form a plurality of coils, and a lead portion led out from the winding portion, and is routed from one end of the core assembly toward another end;
a pair of adjoining two of the coils is assigned as one coil pair of same phase, and individual coil pairs are arranged in order of the phases;
the lead portion of the first phase winding is led out from a first coil pair at one side closest to the another end of the core assembly;
the lead portion of the second phase winding is led out from a second coil pair adjacent to the first coil pair;
the stator comprises terminal pins, each having a hook;
the lead portions of the first phase winding and the second phase winding make up respective wire terminals;
a first terminal pin is disposed in place on the first coil pair, and the wire terminal of the lead portion of the first phase winding is connected to the first terminal pin;
a second terminal pin is disposed in place on the second coil pair, and the wire terminal of the lead portion of the second phase winding is connected to the second terminal pin;

the lead portion of the third phase winding is extended through a plural number of the core pieces in a direction of the other two lead portions, and is formed into an extended wire terminal; and the extended wire terminal and the wire terminals of the other two lead portions are electrically connected by engaging the extended wire terminal in the hooks of both the first and second terminal pins to provide a neutral point of three-phase Y-connection circuit.

2. The motor of claim 1, wherein each of the phase windings is formed by routing a single wire such that the plurality of coils are serially connected.

3. The motor of claim 1, wherein:
the winding is wound on the core assembly via an insulator;
the insulator has a pin retainer for retaining each of the terminal pins; and
the first terminal pin is disposed on the pin retainer of the insulator of the first coil pair, and the second terminal pin is disposed on the pin retainer of the insulator of the second coil pair.

4. The motor of claim 3, wherein the insulator has a protrusion on one face side of the core assembly for hitching the winding.

5. The motor of claim 1, wherein:
the core pieces of the core assembly are coupled via connecting portions in the strip form, and each of connecting portions has V-shaped notch;
the lead portion which is disposed in position on the core piece wound the first phase winding is formed into the wire terminal of the first phase winding;
the lead portion which is disposed in position on the core piece wound the second phase winding is formed into the wire terminal of the second phase winding;
the lead portion of the third phase winding is formed into the extended wire terminal of the third phase winding, and is configured to be routed along a path adjacent to tip ends of the V-shaped notches and to be extended through the core pieces toward the other two lead portions; and
the extended wire terminal and each of the other two wire terminals are electrically connected to provide the neutral point by connections in two positions on each of core pieces.

6. A method for manufacturing a stator of the motor in claim 5, comprising the steps of:
forming the core assembly by stacking a plurality of core sheet materials into layers;
forming a winding assembly by winding a winding on individual core pieces of the core assembly according to a winding pattern;
extending the lead portion of the third phase winding through a plural number of the core pieces in a direction of the other two lead portions, in such a manner that the lead portion of the third phase winding is routing along a path adjacent to tip ends of the V-shaped notches;
electrically connecting a wire terminal of the extended lead portion and wire terminals of the other two lead portions; and
deforming the winding assembly into an annular shape by using connecting portions, and joining both ends of the winding assembly together.

7. A method for manufacturing a stator of the motor in claim 1, comprising the steps of:
forming the core assembly by stacking a plurality of core sheet materials into layers;
forming a winding assembly by winding a winding on individual core pieces of the core assembly according to a winding pattern;
extending the lead portion of the third phase winding through a plural number of the core pieces in a direction of the other two lead portions;
electrically connecting a wire terminal of the extended lead portion and wire terminals of the other two lead portions; and
deforming the winding assembly into an annular shape, and joining both ends of the winding assembly together,
wherein a pair of adjoining two of the coils is assigned as one coil pair of same phase, and individual coil pairs are arranged in order of the phases,
wherein the step of electrically connecting the wire terminals includes:
leading out the lead portion of the first phase winding from a first coil pair at one side closest to the another end of the core assembly; and
leading out the lead portion of the second phase winding from a second coil pair adjacent to the first coil pair, and then electrically connecting together the individual wire terminals,
wherein the stator includes terminal pins, each having a hook, and
wherein the step of electrically connecting the wire terminals includes:
disposing a first terminal pin in place on the first coil pair, and connecting the lead portion of the first phase winding to the first terminal pin;
disposing a second terminal pin in place on the second coil pair, and connecting the lead portion of the second phase winding to the second terminal pin; and
engaging the lead portion of the third phase winding in the hooks of both the first and second terminal pins to electrically connect the wire terminals of the three phase windings as a neutral point.

8. The method for manufacturing a stator of claim 7, wherein the step of forming the winding assembly includes routing of a single wire such that the plurality of coils are serially connected for each of the phase windings, and then forming the winding assembly.

9. The method for manufacturing a stator of claim 7, wherein the step of forming the winding assembly includes:
winding the winding on the core assembly via an insulator that has a pin retainer for retaining each of the terminal pins;
disposing the first and second terminal pins on the pin retainers of the insulators of the first and second coil pairs respectively; and then
electrically connecting together the individual wire terminals.

* * * * *